| United States Patent [19] | [11] Patent Number: 6,156,827 |
|---|---|
| Lemoine et al. | [45] Date of Patent: Dec. 5, 2000 |

[54] BITUMINOUS COMPOSITIONS PREPARED FROM THERMOPLASTIC POLYOLEFINS AND THEIR USES

[75] Inventors: Guy Lemoine, Le Havre; Jacques Nicaud, Nanterre; Jacques Jarrin, Gargenville, all of France

[73] Assignees: Total Raffinage Distribution S.A., Puteaux; Institut Francais du Petrole, Cedex, both of France

[21] Appl. No.: 09/251,433

[22] Filed: Feb. 17, 1999

[30] Foreign Application Priority Data

Feb. 19, 1998 [FR] France .................................. 98 02013

[51] Int. Cl.$^7$ .................................................. C09D 195/00
[52] U.S. Cl. .................................................. 524/59; 524/70
[58] Field of Search ......................................... 524/59, 70

[56] References Cited

U.S. PATENT DOCUMENTS

| 3,395,110 | 7/1968 | Crady, Jr. . | |
| 5,451,621 | 9/1995 | Usmani et al. | 524/68 |
| 5,488,078 | 1/1996 | Shutt et al. | 524/71 |
| 5,516,817 | 5/1996 | Slusher et al. | 523/179 |
| 5,569,516 | 10/1996 | Paeglis et al. | 428/58 |

FOREIGN PATENT DOCUMENTS

| 816 426 | 1/1998 | European Pat. Off. . |
| WO 97/31065 | 8/1997 | WIPO . |

*Primary Examiner*—David Brunsman
*Attorney, Agent, or Firm*—Sughrue, Mion, Zinn, Macpeak & Seas, PLLC

[57] ABSTRACT

Bituminous compositions of the bitumen-polymer type, in homogenous phase, contain at least one bitumen base and are prepared from at least one polymer of the thermoplastic polyolefin type. These compositions have a thermoplastic polyolefin content of at least 1% by weight of which the crystallinity rate is greater than or equal to 30%, a melting temperature greater than or equal to 110° C. and a penetrability at 25° C. less than or equal to 300 tenths of a millimeter.

16 Claims, No Drawings

BITUMINOUS COMPOSITIONS PREPARED FROM THERMOPLASTIC POLYOLEFINS AND THEIR USES

BACKGROUND OF THE INVENTION

This invention relates to compositions that contain mixtures of heavy hydrocarbons, such as bitumen bases and polymers of the thermoplastic polyolefin type, also called bitumen-polymer type bituminous compositions in the remainder of this description. The invention also relates to the preparation of such compositions and their applications in the paving industry, in particular in the construction of roadways, and in other industries, in particular as sealing coats for roofs, insulation boards or anti-corrosion coatings.

It is known that heavy hydrocarbons, identified in the remainder of this description by the term bitumen(s), can be produced, in particular, from crude oil, by distilling the latter and deasphalting the heavy fraction produced by the distillation(s). Based on the origin of the crude oil, the bitumen consists of variable percentages of paraffinic (aliphatic or naphtenic) or aromatic oils, of resins and of asphaltenes (refer to EP-B-246 956).

Based on its constitution, the bitumen may have a character that is more or less thermoplastic. It softens under the effect of heat, its point of softening, commonly called "ball-ring"temperature (BRT) because of the method used in determining it (in accordance with NFT standard 66-008), can, based on the procedure used in obtaining the bitumen, vary between approximately 30 and approximately 130° C.

The behaviors of these bitumens may be judged as insufficient for certain applications that require either good properties when cold, such as:
  resistance to shrinking and cracking when cold, for anti-rutting layers of roads,
  bending when cold, for sealing materials,
or characteristics or workability when hot (controlled viscosity) or of temperature resistance, such as:
  resistance to fluage at high temperatures, in the application of sealing coat construction,
  elastic behavior
  endurance of certain sealants when heated, during certain treatments (bodies of cars).

Known techniques for improving the resistance of a bitumen when heated include:

1) the oxidation of the bitumen using the blowing technique with air at approximately 250° C. The product so obtained can present high "ball-ring" temperatures. It is hard and more brittle.

2) The modification of the bitumen by incorporating SBR (styrene-butadiene-rubber) type polymers, for example, vulcanisable or not, in particular using sulfur (or sulfur donors) or peroxides. This technique requires high and perfectly controlled temperatures over relatively long periods of time. The product so obtained also has a very high viscosity, not very compatible with the procedures of implementation used in the profession. Furthermore, the vulcanization gives the bitumen an irreversible character, not very favorable to an easy implementation.

3) The modification of the bitumen by incorporating certain polyolefin type polymers, such as, in particular, polyethylene. The product's "ball-ring" temperatures can reach values of 100° C., this product has mediocre elasticity properties and a high viscosity.

It is known that, in the last case, only polyethylene with a low density, meaning less that 0.93, can be used, because only the low density thermoplastic polyolefins, due to their weak crystallinity, can be mixed in a homogenous manner with bitumen.

However, these polyolefins are expensive, and the regulations in force in many countries are now urging the manufacturers to recuperate and/or recycle their thermoplastic waste that consists of polyolefins with various densities.

It is in trying to respect the environment that certain manufacturers have proposed to incorporate this thermoplastic waste in the bitumens, for the traditional applications of paving and industrial bitumens. See, for example, FR-B-2 658 524.

However, due to the mixability problems of certain polymers with bitumen as explained above, these manufacturers are forced to use only amorphous or not very crystalline polymers with an adjusted molecular weight, and, this does not resolve the problem posed by the recuperation of thermoplastic waste of all types.

This is how WO 97/31065 describes a bitumen-polymer mixture, where the polymer is chosen from among:
  a) a mostly atactic propylene homopolymer,
  b) an amorphous propylene and alpha-olefin copolymer in C4–C10 and
  c) an amorphous propylene and ethylene copolymer where the a) and b) polymers have an intrinsic viscosity that is greater than 1 dl/g.

The content in polymers may vary from 1 to 40% by weight of the bitumen-polymer mixture.

These polymers are almost all non crystalline.

EP-A- 0 816 426 describes a procedure for the manufacture of thermoplastic compositions for sealing, that includes at least one thermoplastic polymer that may be an ethylene copolymer (80 to 97% by weight) and one comonomer, in particular a n-butyl or bitumen acrylate, and one or several pigments, with the mixture of the polymer and the pigment taking place prior to the introduction of the bitumen.

This type of polymer corresponds to amorphous or very weak crystalline products.

U.S. Pat. No. 3,395,110 describes a bitumen-polymer composition that contains between 1 and 20% by weight of an atactic ethylene-propylene copolymer, with a molecular mass whose weight is between 10 000 and 40 000.

This copolymer, obtained by extraction using pentane, as a sub-product of the manufacture of isotactic polypropylene polymers, is amorphous.

During their research work in this field, the applicants established that, surprisingly so, it is possible to incorporate into bitumens the polyolefins that until now were considered as non incorporable in bitumens.

SUMMARY OF THE INVENTION

Therefore, the object of this invention is to obtain bituminous compositions of the bitumen-polymer type, in a homogenous phase, from thermoplastic polyolefins with a high crystallinity whose molecular mass has been degraded, or from polyolefins with an adjusted molecular mass, making it possible to prevent the inconveniences of the prior technique.

With this in mind, the first goal of the invention is bituminous compositions of the bitumen-polymer type, in a homogenous mixture, containing at least one bitumen base and prepared from at least one polymer of the thermoplastic polyolefin type with a high molecular weight, and at least one polymer of the thermoplastic polyolefin, with these compositions being characterized by the fact that they have:
  a content of at least 1% by weight of a thermoplastic polyolefin, whose crystallinity rate is greater than or equal to 35%, a melting point that is greater than or equal to 110° C., a penetrability at 25° C. that is lesser than or equal to 300 tenths of a millimeter.

As we will see in more detail later, an important advantage of these compositions is that they are easy to work with when hot, while having good properties when cold.

In this invention, the bitumen base that may be used in the bitumen-polymer type composition can be a bitumen, hereafter called a traditionally obtained bitumen, in order to differentiate it from the synthetic bitumen described further on. This traditionally obtained bitumen stems from crude oil, bituminous shales, heavy oils, bituminous sands, etc., or even from coal.

The bitumen can for example be:

a) the heaviest fraction obtained by direct distillation of the crude oil under atmospheric pressure or under reduced pressure;

b) the heavy phase obtained by deasphalting, using a solvent, of a heavy fraction obtained following the procedures described in a);

c) the product of oxidation, in the presence or not of catalysts, of a heavy fraction as set forth in a), or of a heavy phase as set forth in b);

d) the product of oxidation, in the presence or not of catalysts, of a mixture:

of a heavy fraction as set forth in a) or of a heavy phase as set forth in b) and of a distillate, or an aromatic extract obtained by removing the aromatics from lubricating oils, or of a deasphalting pitch;

e) a mixture of an oxidized product according to b) or c) or of a hard base, and a distillate, or a deasphalted oil, or an aromatic extract obtained in the removal of aromatics from lubricating oils, or of a deasphalting pitch, or of a heavy fraction as set forth in a) or of a heavy phase as set forth in b).

The bitumen that can by used may also be a synthetic bitumen whose characteristics are close to those of the traditionally obtained bitumen, as described above, for example a clear synthetic bonding agent that can be colored by adding a pigment.

It can also for example be oil resins, or indene-coumarone resins, mixed with aromatic and/or paraffinic hydrocarbons.

The oil resins can be prepared by the polymerization of unsaturated hydrocarbons present in the unsaturated oil fractions, such as the fractions obtained by thermal or water vapor cracking or by pyrolysis.

The indene-coumarone resins are obtained from coal tars.

The polymer that can be used in implementing the invention is a thermoplastic polyolefin that has linear or slightly ramified hydrocarbon chains and can advantageously be chosen from among the group consisting of polyethylenes with a medium or high density, greater than 0.93, polypropylenes, or olefin copolymers.

The polyethylenes contain the ethylene and one V-olefin conomomer copolymers and homopolymers, the polypropylenes contain the propylene homopolymers and the copolymers with ethylene, and the olefin copolymers contain the ethylene and alcene copolymers rich in ethylene.

Preferably, the thermoplastic polyolefin has an average molecular mass less than or equal in weight to 60 000.

As set forth in a preferential method of execution, the thermoplastic polyolefin is obtained by partial degradation of a high density polyethylene or a polypropylene.

The rate of crystallinity measured by the differential scanning calorimetry (DSC) is greater than or equal to 50% for the polyethylene and greater than or equal to 30%, preferably greater than or equal to 35% for the polypropylene.

The polydispersity of the polymer obtained, which is defined by the Mw/Mn ratio of the molecular mass by weight Mw over the molecular weight by number Mn of said polymer, is reduced by approximately a factor 3 in relation to that of the original polymer.

As set forth in the invention, the original polyolefin that is degraded has an average molecular mass by weight ranging between 80 000 and 1 000 000 and, preferably, between 150 000 and 450 000. Furthermore, advantageously, the bituminous compositions have a dynamic viscosity that is less than or equal to 3000 mPa.s, measured at 180° C., and a shear rate of 50 s$^{-1}$, as well as a ball-ring temperature greater than or equal to 30° C. They also show a melting energy greater than or equal to 2 Joules/gram and, in particular, ranging between 2 and 200 Joules/gram.

Advantageously, the polymer concentration ranges between 1 and 95% by weight in relation to the composition.

According to an advantageous method of execution of the invention, for paving or industrial applications, the bitumen-polymer composition may contain up to 30% by weight of thermoplastic polyolefin type polymer, preferably 1 to 15% by weight, depending on the nature of the polymer and the desired qualities for the use being targeted.

The original polyolefins have an average molecular mass by weight ranging from 80 000 to 1 000 000 for the polyethylenes and from 80 000 to 500 000 for the polypropylenes, and a crystallinity measured using the differential scanning calorimetry (DSC) method greater than 35%.

Thus the applicants have successfully used high density polyethylenes with very high average molecular mass by weight, ranging approximately between 150 000 and 450 000 and possibly reaching 1 000 000.

The bitumen is chosen, as far as its constitution is concerned, in such a way that is has a good compatibility with the polymer, by adjusting the ratios of the saturated hydrocarbons, the aromatics and the bitumen resins.

In order to obtain such a composition, containing for example from 1 to 95% by weight of polymer, it can be advantageous to implement a degradation procedure of at least one thermoplastic polyolefin, carried out prior or simultaneously to the mixture with the bitumen, at a high temperature and in the presence of an appropriate catalyst as described in the request for the French patent filed on Apr. 22, 1997 under number 97 05050, by the applicants.

The thermoplastic polyolefin to be degraded is mixed with the bitumen base and an appropriate preparation containing at least one catalyst chosen from among the solid minerals that contain copper or those with an aluminum and silicon base, and that have an acid character.

Generally, this catalyst is executed in a percentage between 0.1 and 6% by weight in relation to the weight of the thermoplastic polyolefin to be degraded.

The degradation operation is carried out at a temperature that generally ranges between 200 and 600° C., preferably between 250 and 375° C.

From the catalysts described above, we can in particular chose to use the clays activated by an acid treatment, acid silica-aluminas or acid zeolites, or yet cuprous oxide $Cu_2O$.

The degradation operation can be carried out in the absence of bitumen. the product of the degradation is then mixed with the bitumen in an appropriate percentage for the application for which the bitumen-polymer mixture is intended, and in any case at a temperature that is lower than the degradation temperature, for example at a temperature in the range of 160 to 250° C.

The degradation can also be carried out under the conditions mentioned previously, in the presence of a bitumen percentage that may greatly vary, for example from 5 to 99% by weight of bitumen for a percentage of 1 to 95% by weight of the thermoplastic polyolefin (catalyst included).

More particularly we can obtain bitumen-polymer mixtures directly at the appropriate concentrations for industrial or paving applications by bringing into play a percentage of 75 to 99% by weight of bitumen for a percentage of 1 to 25% by weight of degraded thermoplastic polyolefin (catalyst included).

Thus, by bringing into play percentages of bitumen ranging for example from 10 to 40% by weight for percentages of thermoplastic polyolefin from 60 to 90% by weight (catalyst included), we will obtain mixtures with polymer concentrations called "master-mixtures". These mixtures have the advantage of being easily stored after having been cooled and granulated. Then, in order to use then, all that is needed is to dilute them when hot in bitumens with the appropriate concentrations for the applications being considered.

In all cases, the percentages of degraded thermoplastic polyolefin that is found in the final bituminous composition can be:

from 1 to 15% by weight and, preferably, approximately 5% by weight, for the paving applications, in particular as anti-rutting coatings for roadway surfaces or as binder courses, and from 3 to 25% by weight, preferably between 11 and 12% by weight, for the industrial applications, such as the sealing coats for roofs, thermal or sound insulation boards and anti-corrosion coatings.

Furthermore, in the case where we wish to enhance the properties of the bituminous compositions of the invention when cold, such as the brittle point or flexibility when cold, by introducing elastomers such as SBS (styrene-butadiene-styrene) type rubbers or atactic polypropylene, these can be introduced either during the degradation step of the thermoplastic polyolefin, at high temperature, in the presence of the catalyst, or during the preparation by dilution of the final mixture at a lower temperature.

In the preparation of the bituminous compositions of the invention, the mixture of thermoplastic polyolefin and the catalyst, possibly in the presence of the bitumen, can be carried out following different techniques using either a reactor or a mill, for a non continuous procedure, or a single or double screw extruder for a continuous procedure.

For example, the degradation of the polymer at high temperature and in the presence of the catalyst allows for the polymer to become mixable with the bitumen by acting on the molecular mass of the polymer. The polymer thus adjusted has an average molecular mass by weight that is distinctly less than that of the original polymer since it reaches a value ranging from 40 000 to 60 000 for a polyethylene or a mixture of polyethylenes, with a weak polydispersity, that, as indicated above, is reduced by approximately a factor 3 in relation to the original polymer.

The bitumen-polymer type compositions consistent with this invention are particularly well adapted to the traditional uses of bitumens, in particular in the paving applications, such as anti-rutting layers or base or binding layers for roadways, as well as in the industrial applications, in the manufacture of sealing coats for roofs, insulation boards or anti-corrosion coatings. These uses make up anther object of this invention.

Furthermore, these compositions can also be used in the field of final treatment of industrial or household waste, such as household waste incinerator ashes (REFIOM), as coating and inerting agents for these ashes, prior to their storage.

The following examples illustrate the invention, without restricting it in any way.

DETAILED DESCRIPTION OF THE PREFERRED EMBODIMENTS

In Examples 1 through 4, we will use bitumen-polymer compositions consistent with the invention, prepared from a MM1 master-mixture whose preparation is described hereafter.

This preparation is carried out by degradation of a polyethylene in the presence of a relatively low percentage of bitumen base (30% by weight, in relation to the total), and a catalyst. We use a bitumen base with an oil origin called base B, that, when used alone, is not appropriate for the bitumen applications listed hereafter. This base B has the following characteristics:

kinematic viscosity at 100° C.: 615 mm$^2$/s, penetrability at 25° C. in ¹/₁₀ mm, according to the NF-T-66004 standard: 500, softening point (ball-ring temperature or BRT, according to the NF-T-66008 standard): 24.5° C.

The polyethylene used is a high density polyethylene recuperated from the oil drums already used and crushed into a coarse powder, whose smallest dimension is around a few millimeters. Before being transformed into drums, this polyethylene is sold under the commercial name of Lupolen 5021D® by BASF. Its characteristics are as follows:

density: 0.949, melt flow index measured at 190° C. under a 2.16 kg charge consistent with ASTM D 1238 standard: 0.5 g/10 mn, average molecular mass by weight (1): 150 000, average molecular mass by number (1): 20 000, (1) measured by chromatography using gel permeation.

Its crystallinity rate measured by differential scanning calorimetry (DSC) is around 50% and is not greatly modified after the degradation.

In order to get rid of the cooling conditions of the polymer at the end of the degradation (thermal past), the following cycle is required with each sample:

increase in temperature from 50 to 200° C. at a rate of 10° C./mn, 5 mn rest at 200° C., then decrease from 200° C. to 50° C. at a rate of 20° C.:mn, and 5 mn rest at 50° C.

Its degradation is carried out with approximately 3.5 by weight, in relation to the overall bitumen plus polyethylene, of a clay type catalyst with a montmorillonite base (hydrated aluminum silicate with a $SiO_2/Al_2O_3$ ratio of 4/1), treated by a mineral acid, sold under the brand name Tonsil Optimum FF® by Süd-Chemie and hereafter referred to as Tonsil®. The mixture is carried out in a reactor, under agitation, at 350° C. for 1 hour, so as to obtain a MM1 master-mixture. The average molecular mass by weight of the degraded polyethylene is approximately 40 000. For your information, this master-mixture has a melting point, measured according to the TOTAL differential scanning calorimetry (DSC) internal method, of 126.4° C., whereas the degraded polyethylene alone, with the same catalyst and under the same conditions, has a melting point of 130.9° C.

EXAMPLE 1

This example relates to the preparation of a bitumen-polymer type composition C1 consistent with the invention.

2% by weight of the MM1 master-mixture is diluted in 98% by weight of the bitumen base B, at 190° C., under agitation, for 1 hour. The C1 composition so obtained is poured in the form of plates with a width of 2 mm, of which the appearance as well as certain characteristics are examined such as:

the softening point (or ball-ring temperature, BRT) measured in accordance with the NF-T 66-008 standard, in ° C., the penetrability at 25° C., in 1/10 mm (measured in accordance with the NF-T-66-004 standard), the brittle point, in ° C. (measured in accordance with the NF-T-66-026 standard), which indicates the temperature at which the cracking of a binding film appears under certain mechanical stress, the Contraves dynamic viscosity, in mpa.s, measured at 180° C. and with a sheer rate of 50 $s^{-1}$, in accordance with the TOTAL 644 method, and melting energy, measured in Joule/g, in accordance with the DSC method.

The results obtained are indicated in Table 1 hereafter.

The C1 composition has a smooth, homogenous appearance which translates a very good dispersion of the polyethylene in the bitumen. Furthermore, is has a ball-ring temperature or BRT of 35° C., a brittle point of −23° C., a penetrability at 25° C. of 213 tenths of a mm, a melting point of 118.2° C. and a melting energy of 2.66 J/g.

This example illustrates that the C1 composition as set forth in the invention has characteristics such that it corresponds to a standard bituminous TOTAL composition, graded v 180/220, whose characteristics are as follows:

ball-ring temperature (in ° C.): between 34 and 43, penetrability at 25° C. (in 1/10 th of mm): between 180 and 220, brittle point (in ° C.): less than or equal to −13.

Yet such a composition, by incorporation of the SBS or SBR type polymers, at rates of 10 to 20% by weight, that allow in particular for a major increase of its BRT, is granted a good temperature resistance, which allows it to be used as a base for the manufacture of seal coats, in particular for roofs.

EXAMPLE 2

This example relates to the preparation of a composition C2 consistent with the invention.

This composition is prepared from the same MM1 master-mixture as that of example 1.

We mix 5% by weight of the MM1 master-mixture with 95% by weight of a bitumen base called base A, which is a residue under vacuum of direct distillation of an ARAMCO type crude oil and has a kinematic viscosity, at 100° C., of 625 $mm^2$/s and a softening point of 23° C.; this base, used alone, is not adequate for the bitumen applications.

The C2 composition so obtained is molded into 2 mm thick plates, so as to observe its appearance, which is homogenous, and to determine the ball-ring temperature, which is 43.5° C., its brittle point, equal to −27° C., its penetrability at 25° C., equal to 190 tenths of a mm, its Contraves viscosity, or 95 mPa.s, its melting point, equal to 121.2° C., and its melting energy, 6.35 J/g.

We have thus obtained a composition that has characteristics close to those of a standard bitumen TOTAL base, graded V 180/220, which can serve as a base for the same industrial applications as in the previous example.

COMPARATIVE EXAMPLE 2

This example relates to the preparation of a bitumen-polymer composition of the prior art obtained by mixing 96.5% by weight of a low density polyethylene (reference PEBD, in table 1 hereafter), sold under the reference Lacqtene 1020® by Atochem, so as to have the same polymer content as in example 2.

Its characteristics are as follows:

density: 0.924, melt flow index measured at 190° C., under a charge of 2.16 kg according to the ASTM D 1238 standard: 2 g/10 mn, average molecular mass by weight: 50 000 n measured by chromatography by gel permeation.

The composition so obtained, at 190° C. under agitation for 1 hour, is molded into 2 mm thick plates, whose appearance is not homogenous. Its ball-ring temperature is 44° C., its penetrability at 25° C. is 175 tenths of a mm, its Contraves viscosity is 86 mPa.s, its melting point is 86.7° C., and its melting energy is 3.65 J/g.

We have thus obtained a composition whose characteristics are close to those of the standard bitumen base of the previous example, however with a bad homogeneity, which will therefore cause problems of implementation.

EXAMPLE 3

This example relates to the preparation of a bitumen-polymer composition C3 consistent with the invention.

We start with the same MM1 master-mixture, of which 16.5% by weight is mixed with 83.5% by weight of a standard bitumen base graded as V 180/220.

The C3 composition obtained has a ball-ring temperature of 122° C. and a penetrability of 18 tenths of a mm, which places it on the same performance level as an oxidized bitumen base graded 120/25 (BRT/penetrability), used in the manufacture of shingles. Is also has a Contraves viscosity of 930 mpa.s, a melting point of 121.3° C. and a melting energy of 22.27 J/g. Thus, we obtain a composition that resists fluage at high temperatures, while having the appropriate viscosity.

COMPARATIVE EXAMPLE 3

This example relates to the preparation of a bitumen-polymer composition of the prior art, obtained by mixing 88.5% by weight of the same v 180/220 bitumen base as in example 3 with 11.5% by weight of the same low density polyethylene (reference PEBD in Table 1 hereafter), sold under the name Lacqtene 1020® by Société Atochem, so as to have the same polymer content as in Example 3.

Its mixture under agitation at 190° C. is not homogenous. Its ball-ring temperature, which is 85° C., drops distinctly compared to that of example 3, and its penetrability changes to 43 tenths of a mm, which does not allow this composition to be used to replace an oxidized bitumen base graded 120125 (BRT/penetrability), for industrial applications such as roof coatings.

EXAMPLE 4

This example relates to the preparation of a bitumen-polymer composition C4 consistent with the invention.

We start with the same MM1 master-mixture of which we mix 10% by weight with 90% by weight of the bitumen base called base A, described in example 2, which is a base that is inappropriate for the sought bitumen applications. After molding the composition so obtained into 2 mm thick plates and verifying its homogenous appearance, the following characteristics are measured:

ball-ring temperature: 120° C.

penetrability: 65 tenths of a mm brittle point: −19° C.

Contraves viscosity: 200 mPa.s melting point: 121.3° C.

melting energy: 12.74 J/g.

This example shows that the dilution of a master-mixture as set forth in the invention in a bitumen base that is inappropriate for the sought applications makes it possible to obtain a modified bitumen with certain characteristics of commercial paving bitumens and, in this case, in particular, a v 50/70 TOTAL bitumen, whose characteristics are as follows:

ball-ring temperature or BRT (in ° C.): between 45 and 51, penetrability at 25° C. (in 1/10 th of mm): between 50 and 70.

We note the high values of the softening temperature (BRT=120° C.), as well as the good properties of the C4 composition as set forth in the invention when cold, which therefore has characteristics such that it can be used to manufacture coatings when hot for paving applications.

The characteristics of the compositions from the above-mentioned examples 1 through 4 and the comparative examples 2 and 3 are compiled in TABLE 1 hereafter.

weight of a commercial bitumen, called V 110/130 EXP202, with a penetrability of 110–130 tenths of a mm and a softening point or BRT of 43° C., in a Rayneri mixer at 180° C.

The C5 composition so obtained is molded at 190° C. into 2 mm thick plates, so as to observe its appearance, which is homogenous, and to determine its ball-ring temperature BRT, which is 154° C., its penetrability, which is 16 tenths of a mm. A test for flexibility when cold, according to the TOTAL 587 internal method, gives a value of −5° C. Its Contraves viscosity is 480 mPa.s, its melting point is 151° C. and its melting energy is 7.1 J/g.

The C5 composition as set forth in the invention has a high ball-ring temperature, which gives it good temperature resistance, and a good rigidity, which makes it possible to use it in the manufacture of soundproofing boards or sealing coats, and to replace bitumen and atactic polypropylene compositions used at rates of 20 to 30% by weight.

COMPARATIVE EXAMPLE 5

This example relates to the preparation of a bitumen-polymer composition of the prior art, obtained by mixing 86% by weight of the same commercial bitumen as in example 5, called V 110/130 EXP202, with 14% by weight of an atactic polypropylene (called APP in Table 2

TABLE 1

| Example | 1 | 2 | Comp 2 | 3 | Comp 3 | 4 |
|---|---|---|---|---|---|---|
| Bitumen | Base B | Base A | Base A | V180/220 | V180/220 | Base A |
| (% by weight) | 98 | 95 | 96.5 | 83.5 | 88.5 | 90 |
| Master-Mixture | MM1 | MM1 | — | MM1 | — | MM1 |
| (% by weight) | 2 | 5 | — | 16.5 | — | 10 |
| PEBD | — | — | 3.5 | — | 11.5 | — |
| (% by weight) | | | | | | |
| Plate appearance at 190° C. | Homogenous | Homogenous | Non-homogenous | Homogenous | Non-homogenous | Homogenous |
| BRT (° C.) | 35 | 43.5 | 44 | 122 | 85 | 120 |
| Penetrability (in 1/10 mm) | 213 | 190 | 175 | 19 | 43 | 65 |
| Brittle T (° C.) | −23 | −27 | — | — | — | −19 |
| Flexibility when cold (° C.) | — | — | −5 | — | 5 | — |
| Viscosity at 180° C., 50s$^{-1}$ (in mPa · s) | 48 | 95 | 86 | 930 | 700 | 200 |
| Melting point (° C.) | 118.2 | 121.2 | 96.7 | 122.7 | 87.9 | 121.3 |
| Melting energy (J/g) | 2.66 | 6.35 | 3.64 | 22.27 | 11.25 | 12.74 |

EXAMPLE 5

We prepare a MM2 master-mixture, through degradation of an isotactic polypropylene sold under the name HOSTALEN FPK 1032® by Boechst, of average molecular masses, determined by chromatography by permeation of gel, of 380 000 for the molecular mass by weight and of 103 000 for the molecular mass by number, in the presence of 1% by weight of an oxidized cuprous catalyst and mix it with a bitumen base B, on the basis of 70% by weight of polypropylene, in relation to the overall weight of the mixture.

We use a mill at a rotation speed of 200 turns/mn and at 300° C. for 30 minutes.

The degraded polypropylene so obtained has an average molecular weight of approximately 57 000.

From this MM2 master-mixture, we produce a composition C5 by mixing 20% by weight of MM2 with 80% by hereafter), which is an amorphous polyolefin and is sold under the name Vestoplast® by Hüls, so as to have the same polymer content as in example 5.

Its mixture under agitation at 190° C. is almost homogenous.

Its ball-ring temperature, which is 97° C., drops distinctly as compared to that of example 5 () T=57° C.) and its penetrability changes to 47 tenths of a mm.

Such characteristics do not allow for this composition to be used in place of the previous compositions for the same industrial applications.

EXAMPLE 6

Starting with the previous MM2 master-mixture, we prepare a composition C6 by mixing 11.5% by weight of MM2 with 88.5% of the bitumen base B, under the same conditions as in example 5.

The BRT ball-ring temperature of the C6 composition is 151° C., its penetrability is 37 tenths of a mm, its melting point is 150.2° C., its melting energy is 6.7 J/g and its Contraves viscosity is 74 mpa.s. Its flexibility when cold is −5° C. This C6 composition can therefore be used for the same applications as that of example 5.

COMPARATIVE EXAMPLE 6

This example relates to the preparation of a bitumen-polymer composition of the prior art, obtained by mixing 92% by weight of the same bitumen base B with 8% by weight of the same atactic polypropylene as that used in the comparative example 5 (reference APP in Table 2 hereafter) so as to obtain the same polymer content as in example 6.

Its mixture under agitation at 190° C. does not give a good homogeneity.

Its ball-ring temperature, which is 62° C., drops even more distinctly in relation to that of example 6 () T=80° C.), and its penetrability changes to 105 tenths of a mm, which does not allow for this composition to be used in place of the preceding composition for the same industrial applications.

The characteristics of the compositions of examples 5 and 6 and the comparative examples 5 and 6 are compiled in Table 2 hereafter.

TABLE 2

| Example | 5 | Comp 5 | 6 | Comp 6 |
|---|---|---|---|---|
| Bitumen | V100/130 | V100/130 | Base B | Base B |
| (% by weight) | 80 | 86 | 88.5 | 92 |
| Master-mixture | MM2 | — | MM2 | — |
| (% by weight) | 20 | — | 11.5 | — |
| APP % weight | — | 14 | — | 8 |
| Plate appearance At 190° C. | Homogenous | Almost homogenous | Homogenous | Non-homogenous |
| BRT (° C.) | 154 | 97 | 151 | 62 |
| Penetrability (in 1/10 mm) | 16 | 47 | 37 | 105 |
| Flexibility When cold (° C.) | −5 | 5 | −5 | −5 |
| Viscosity at 180° C., 50s$^{-1}$ (in mPa · s) | 480 | 500 | 74 | 110 |
| Melting point (° C.) | 151 | 144.4 | 150.2 | 139.7 |
| Melting energy (J/g) | 7.10 | 1.29 | 6.70 | 1.33 |

What is claimed is:

1. A bituminous composition of the bitumen-polymer type, in homogenous phase, containing at least one bitumen base and prepared from at least one polymer of the thermoplastic polyolefin type with a high molecular mass, said composition comprising:

a content of at least 7% by weight of a thermoplastic polyolefin whose crystallinity rate is greater than or equal to 30%, a melting temperature greater than or equal to 10° C., and a penetrability at 25° C. that is less than or equal to 300 tenths of a millimeter.

2. The bituminous composition as set forth in claim 1, wherein the thermoplastic polyolefin is chosen from among the group consisting of medium or high density polyethylenes, polypropylenes, or olefin copolymers.

3. The bituminous composition as set forth in claim 1, wherein the thermoplastic polyolefin has an average molecular mass by weight that is less than or equal to 60.000.

4. The bituminous composition as set forth in claim 1, wherein the polymer is obtained by partial degradation of a polyolefin.

5. The bituminous composition as set forth in claim 4, wherein the polydispersity of the degraded polymer is reduced by approximately a factor of 3 in relation to the original polymer.

6. The bituminous composition as set forth in claim 4, wherein the original polyolefin that has been degraded has an average molecular mass by weight ranging between 80,000 and 1,000,000.

7. The bituminous composition as set forth in claim 4, wherein the polyolefin to be partially degraded is a high density polyethylene or a polypropylene.

8. The bituminous composition as set forth in claim 6, wherein said molecular mass ranges between 150,000 and 450,000.

9. The bituminous composition as set forth in claim 1, wherein the polyolefin is a polyethylene whose crystallinity rate is greater than or equal to 50%.

10. The bituminous composition as set forth in claim 1, wherein the polyolefin is a polypropylene whose crystallinity rate is greater than or equal to 30%.

11. The bituminous composition as set forth in claim 10, wherein said polypropylene has a crystallinity greater than or equal to 35%.

12. The bituminous composition as set forth in claim 1, having a dynamic viscosity that is less than or equal to 3000 mPa.s, measured at 180° C. and a sheer rate of 50 s$^{-1}$.

13. The bituminous composition as set forth in claim 1, having a ball-ring temperature greater than or equal to 30° C.

14. The bituminous composition as set forth in claim 1, having a melting energy greater than or equal to 2 Joules/gram.

15. The bituminous composition as set forth in claim 14, wherein said melting energy ranges between 2 and 200 Joules/gram.

16. The bituminous composition as set forth in claim 1, containing 10 to 40% by weight of by bitumen and 60 to 90% by weight of a polyolefin.

* * * * *